(12) United States Patent
Naqvi

(10) Patent No.: US 6,765,483 B1
(45) Date of Patent: Jul. 20, 2004

(54) METHOD AND APPARATUS FOR LOCKING AND UNLOCKING BRAKE LIGHTS

(76) Inventor: Syed Muhammad Ali Naqvi, P.O. Box 18056 North Nazimabad, Karachi (PK), 74700

(*) Notice: Subject to any disclaimer, the term of this patent is extended or adjusted under 35 U.S.C. 154(b) by 1 day.

(21) Appl. No.: 10/171,433
(22) Filed: Jun. 13, 2002
(51) Int. Cl.[7] .................................................. B60Q 1/44
(52) U.S. Cl. .................... 340/479; 340/464; 340/467; 340/468; 307/10.8; 180/282
(58) Field of Search ................................ 340/479, 464, 340/438, 467, 468, 471, 475; 307/10.8, 10.1; 200/61.89; 180/282

(56) References Cited

U.S. PATENT DOCUMENTS

| | | | | |
|---|---|---|---|---|
| 3,760,353 A | * | 9/1973 | Hassinger | 340/467 |
| 4,538,107 A | * | 8/1985 | Varone | 324/206 |
| 5,725,075 A | * | 3/1998 | Chou | 340/463 |
| 6,031,451 A | * | 2/2000 | Graves et al. | 340/468 |

* cited by examiner

Primary Examiner—Anh V. La
(74) Attorney, Agent, or Firm—Michael I. Kroll

(57) ABSTRACT

The present invention addresses the need to sustain brake lights illumination of a motor vehicle at substantially stationary state even after brake pedal is released in order to ensure traffic safety. This device employs a number of commonly available relays not only to sustain the power to the brake lights but also to monitor the state of the movement of the vehicle. The circuit is largely composed of three main sections: a power supply relay, a latching-unlatching relays and a sensor array. One common type of relays can be used to all three of these parts. Different from prior arts in this matter, no sensor on a power shaft is needed, although such device can be accommodated. Instead, simple tilting type mercury switches are used for sensing the acceleration of a vehicle. This device can be integrated with many other motion sensing devices. These sensor actions can also be blocked or supplemented by the engagement of the parking brake or the cruise control. This device can be manufactured and installed originally in the factory, or can be installed by a user with a few tools economically.

6 Claims, 11 Drawing Sheets

<Normal State>        <Activated State>

STEPS (REFERRING TO THE FLOW CHART FIG. 7)

METHOD AND APPARATUS FOR LOCKING AND UNLOCKING BRAKE LIGHTS

BACKGROUND OF THE INVENTION

This application is subject to Disclosure Document Program, the disclosure having been filed 10 May 2001 and having been assigned number 493,330.

1. Field of the Invention

This invention relates to vehicle brake lights, specifically to a method and apparatus of maintaining the illumination of the brake lights even after the release of the brake pedal while the vehicle is substantially stationary on highways so as to alert other drivers and ensure safety.

2. Description of the Prior Art

There are other devices that partially address the control of the illumination of the brake lights for the purpose of alerting other motorists on the state of a vehicle's slow movement. Notable of these are the following two patents:

One is the U.S. Pat. No. 4,806,782, issued to Patrick J. Bernal on Feb. 21, 1989. Although this device addresses the same matter in some ways, it is a complicated device that is difficult and expensive to install as well as limited in option. For example, the only way for this device to sense the movement of a vehicle is to directly measure the speed of the vehicle by attaching a sensor on a rotational shaft of the vehicle, requiring expert installation.

Another device was patented to Paul J. Michaud on Jul. 2, 1996 as U.S. Pat. No. 5,532,674. This device is, by and large, limited to motorcycles assuming the presence of certain devices exclusive to motorcycles. As with the previous device, the motion of the motorcycle is detected by means of a sensor installed to a rotational shaft, requiring complicated and expensive installation.

U.S. Pat. No. 4,806,782

Inventor: Patrick J. Bernal

Issued: Feb. 21, 1989

The present invention relates to an auxiliary brake light control system which has its primary application in motor vehicles equipped with standard transmissions. In such vehicles, the brake lights are normally illuminated by means of a pressure switch associated with the brake pedal whenever pressure is manually-applied to the brake pedal by the driver. However, as the car slows toward a stop, or after it has actually stopped the driver normally releases his foot from the brake pedal and moves his left foot over to the clutch and his right foot over to the gas pedal thereby turning off the brake light to falsely indicate to those following that the car is not stopped. However, since the car is actually cruising at a very low speed or stopped, severe safety hazards may result. The present invention provides an auxiliary brake light control system which senses the motion of the motor vehicle by means of magnets attached to a rotating shaft whose speed of rotation is proportional to the speed of the motor vehicle to generate a first signal when the speed of the motor vehicle is faster than a predetermined speed and a second signal when it is moving slower than the predetermined speed. A relay coil is normally energized in response to the first signal to keep the brake lights off unless the operator applies pressure to the brake pedal, but for switching the relay coil to a de-energized state whenever the speed falls below a predetermined value for turning on the brake lights even if the operator removes his foot from the brake pedal. The detected signal from the rotating shaft is amplified, smoothed to a DC level, and applied to a comparator whose output controls a transistor switch to maintain the relay coil energized or de-energized, as desired. A DPDT switch is responsive to the state of the relay coil for supplying 12 volt battery potential to the brake lights when the relay coil is de-energized.

U.S. Pat. No. 5,532,674

Inventor: Paul J. Michaud

Issued: July 2, 1996

A new system to illuminate and maintain illuminated a brake light on a motorcycle anytime the throttle handle is in the idle position, or, primarily when the motorcycle is substantially stopped. In one system, an electrical switch linked with the brake light electrical circuit and mounted in the throttle handle assembly, is so positioned and aligned with a plunger molded on the throttle handle, to provide that anytime the throttle handle is in it's normal or released idle position, the plunger will actuate the switch to complete the circuit and illuminate the brake light. In another system, a control senses motorcycle movement, and illuminates the brake light when the motorcycle is sufficiently stopped, as at a traffic signal. Yet another system combines the two systems, automatically illuminating the brake light when the motorcycle has been stopped and the throttle handle is in the idle position.

SUMMARY OF THE PRESENT INVENTION

A primary object of the present invention is to provide an electronic apparatus for maintaining illumination of the brake lights initiated with the depression of the brake pedal of a vehicle even after the brake pedal is released while the vehicle is substantially stationary.

The present invention overcomes many of the shortcomings of the prior arts, some of which have been mentioned above, by providing a relatively simple circuit that is mainly made up of common relays. This invention also provides economical and simple ways to detect the state of the movement of a vehicle by employing mercury switches. In particular, this device does not require installation of a speed sensor on a drive shaft of a vehicle as in the prior art. Not only can this device be expertly and originally installed by the manufacturers of vehicles, it can also be easily installed by anyone handy with a few common tools. This invention is, however, flexible and does not exclude the use of such speed sensors as mentioned.

Use of such devices as the mercury switches enables this invention to be easily used in almost all forms of vehicles, including motorcycles, mopeds, and other utility vehicles.

The foregoing and other objects and advantages will appear from the description to follow. In the description, reference is made to the accompanying drawing, which forms a part hereof, and in which is shown, by way of illustration, specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

DESCRIPTION OF THE REFERENCED NUMERALS

Figure 1:
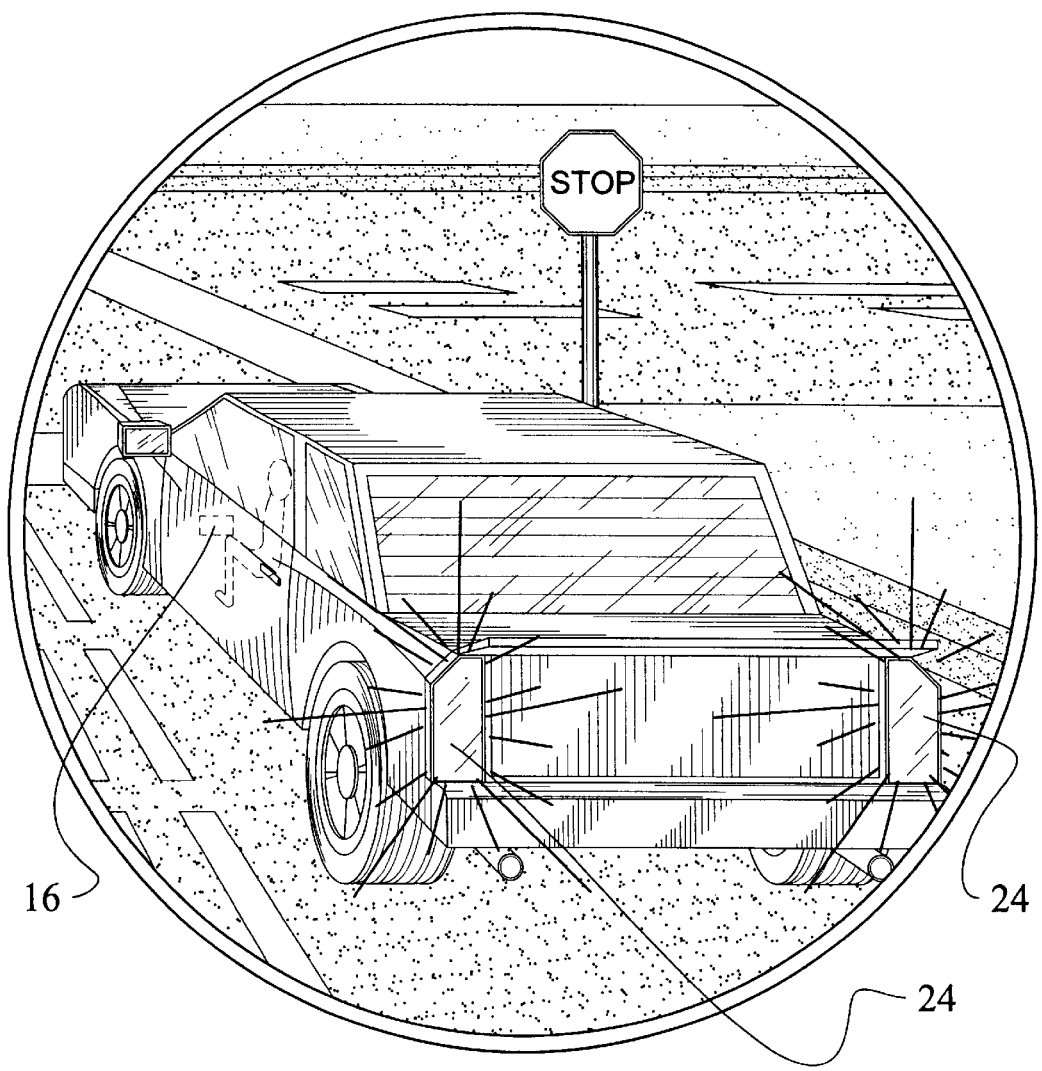
FIG. 1 is an illustrative view of the present invention in use.

The following is a list of the reference numerals used in the drawings:
10 Control Unit (Current Invention)
12 Battery
14 Ignition switch
16 Brake Pedal
18 Mercury Sensor
20 Cruise Control Switch
22 Parking Brake Switch
24 Brake Lights
26 Negative Terminal of Automobile Battery
28 L.E.D.
30 Positive Terminal of Automobile Battery
32 Brake Pedal Switch
34 Mercury Ball
36 Contact Electrodes
38 Mercury Switch
40 Mercury Switch

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to appended claims.

The present invention relates generally to motor vehicle brake lights and more specifically to a method and apparatus whereby the brake lights, when applied, will remain on until motion is detected by said apparatus whereupon the brake lights will be turned off. FIG. 1 illustrates an automobile as an example in which the brake lights 24 comes on with the depression of the brake pedal 16. It is the function of the current invention to manage the duration of the illumination of such brake lights after the brake pedal is released so that the brake lights stays on while the motor vehicle is stationary. The brake light control device can be installed by original equipment manufacturers or retrofitted to existing motor vehicles.

Figure 2:
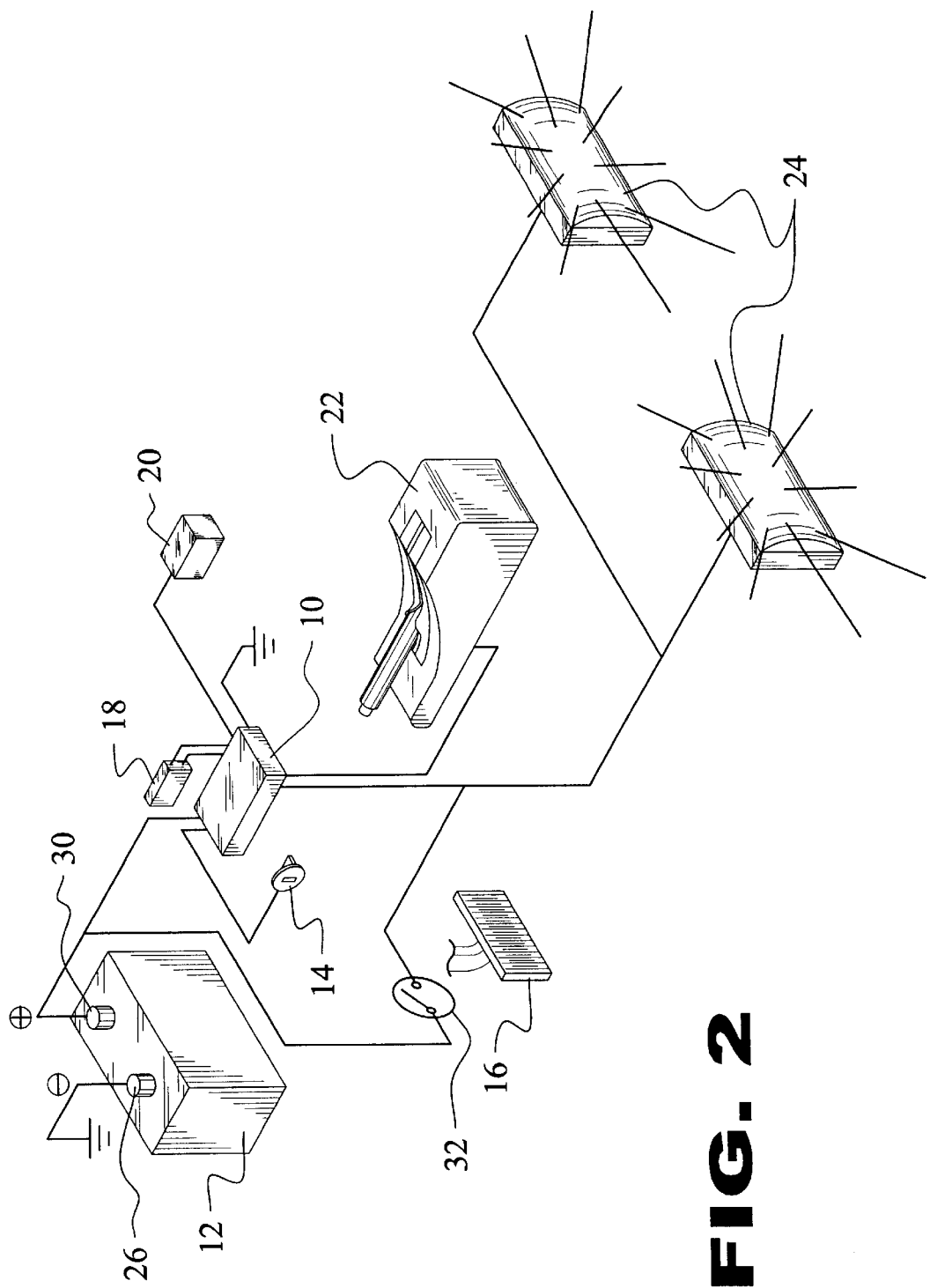
FIG. 2 is an illustrative view of the present invention.
Figure 3:
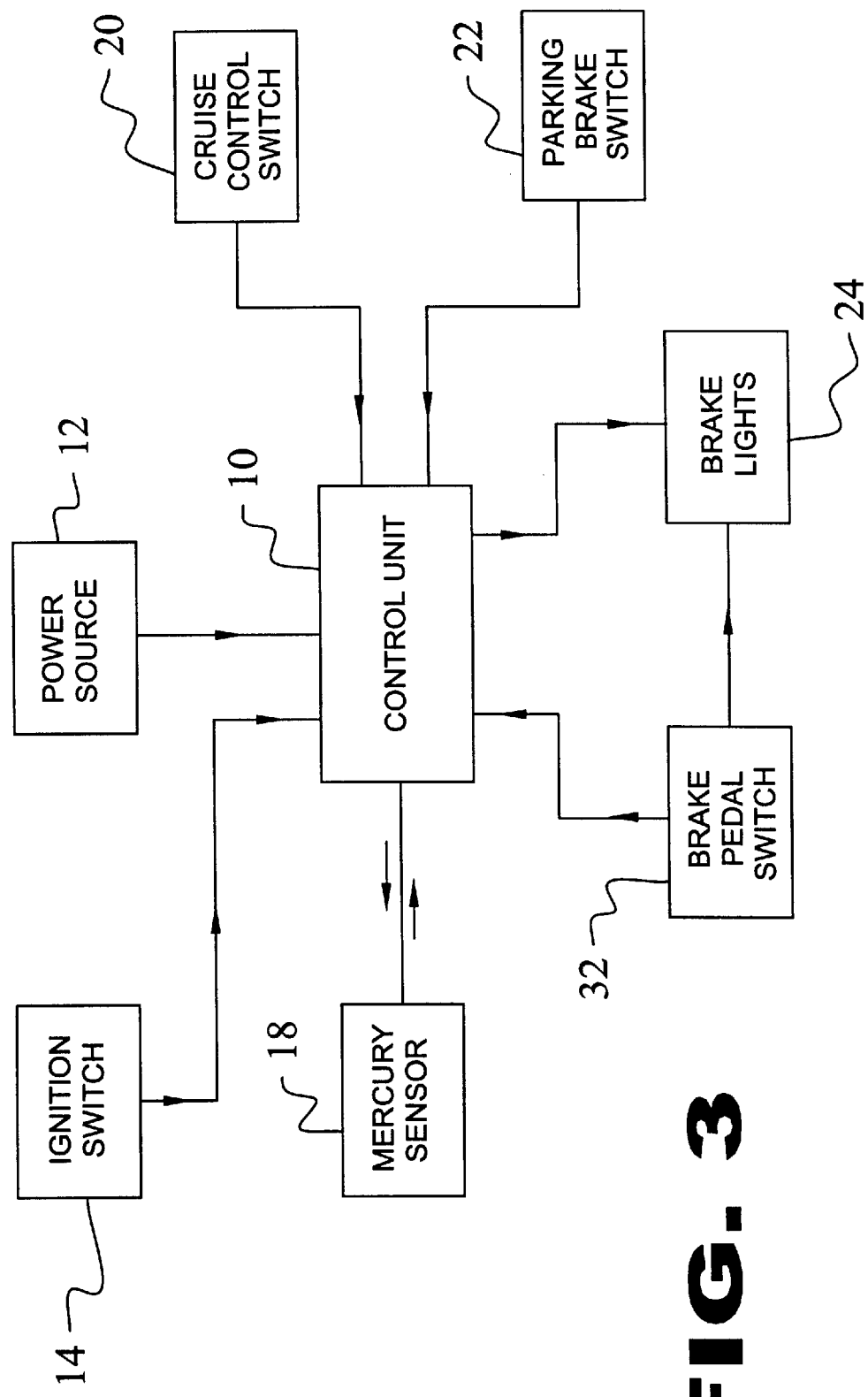
FIG. 3 is a block diagram of the present invention.

FIG. 2 shows various interacting and interconnecting parts in a vehicle such as an automobile and the present invention. In this vehicle, the present invention 10 is shown to be interconnected with the battery 12, brake pedal switch 32, brake lights 24, ignition switch 14, parking brake switch 22, and cruise control switch 20, if any. Also connected is the mercury sensor 18 that monitors the acceleration and the movement of the vehicle. The interaction of these devices is shown in FIG. 3 in a block diagram, where the arrows indicate the general direction of the flow of control.

Figure 4:
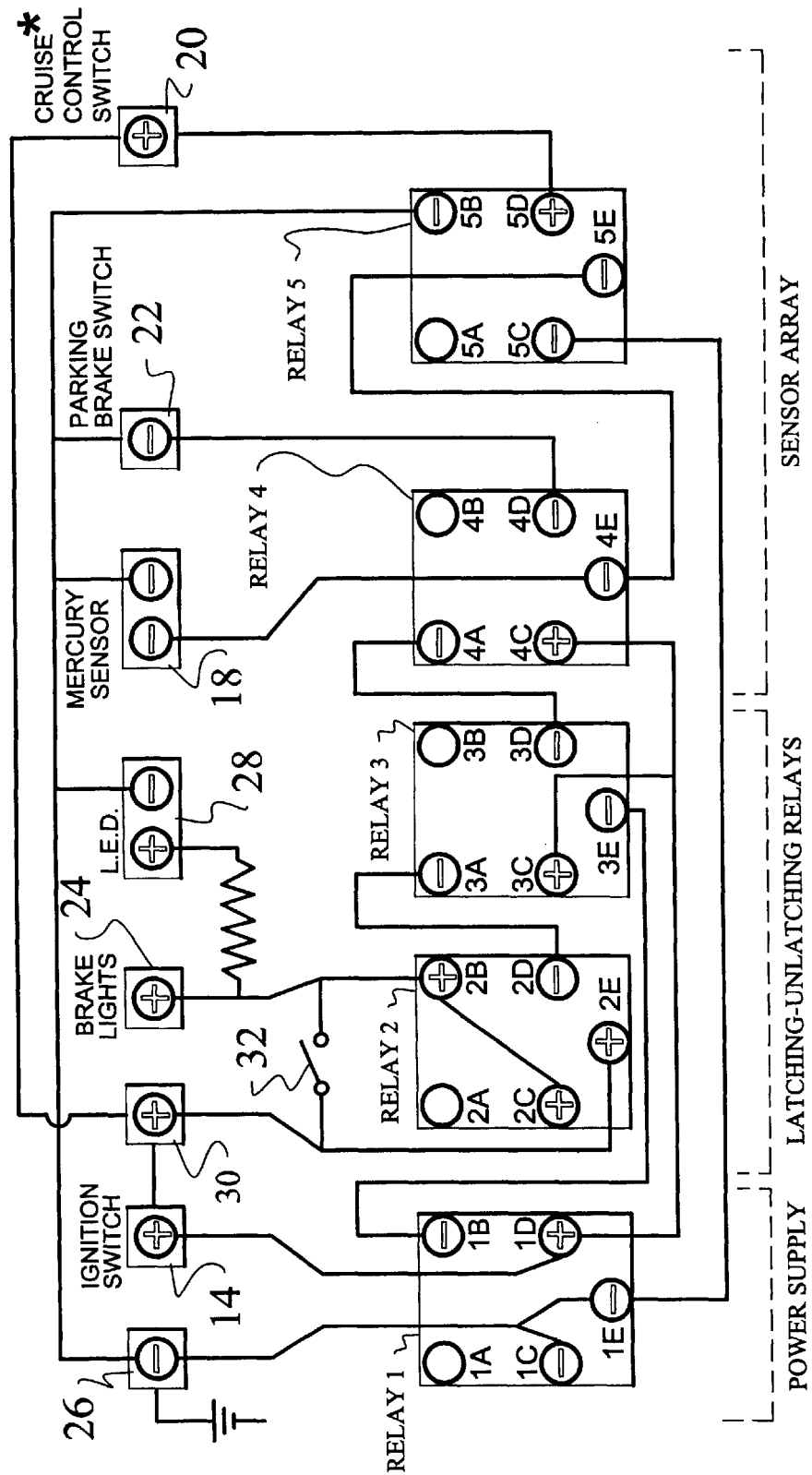
FIG. 4 is a schematic diagram of the control unit of the present invention.

The current invention is generally composed of three main sections; a power supply relay, a latching and unlatching relays and a sensor array to prioritize the control voltage. FIG. 4 shows one realization of the current invention and the three main sections. Power supply relay upon receiving positive voltage from the ignition switch 14 supplies power to the current invention. In the second section the first relay is for a latching and it ensures that power is supplied to the brake lights 24 and the L. E. D. 28 after the brake pedal 16 is depressed and released until instructed by the second relay which is for unlatching to disengage power. The third section prioritizes by blocking or supplementing the control voltage to the unlatching relay in the second section depending upon whether it is the simple case of forward motion or whether the parking brake is applied after stopping or whether the cruise control has been engaged during driving.

Figure 5:
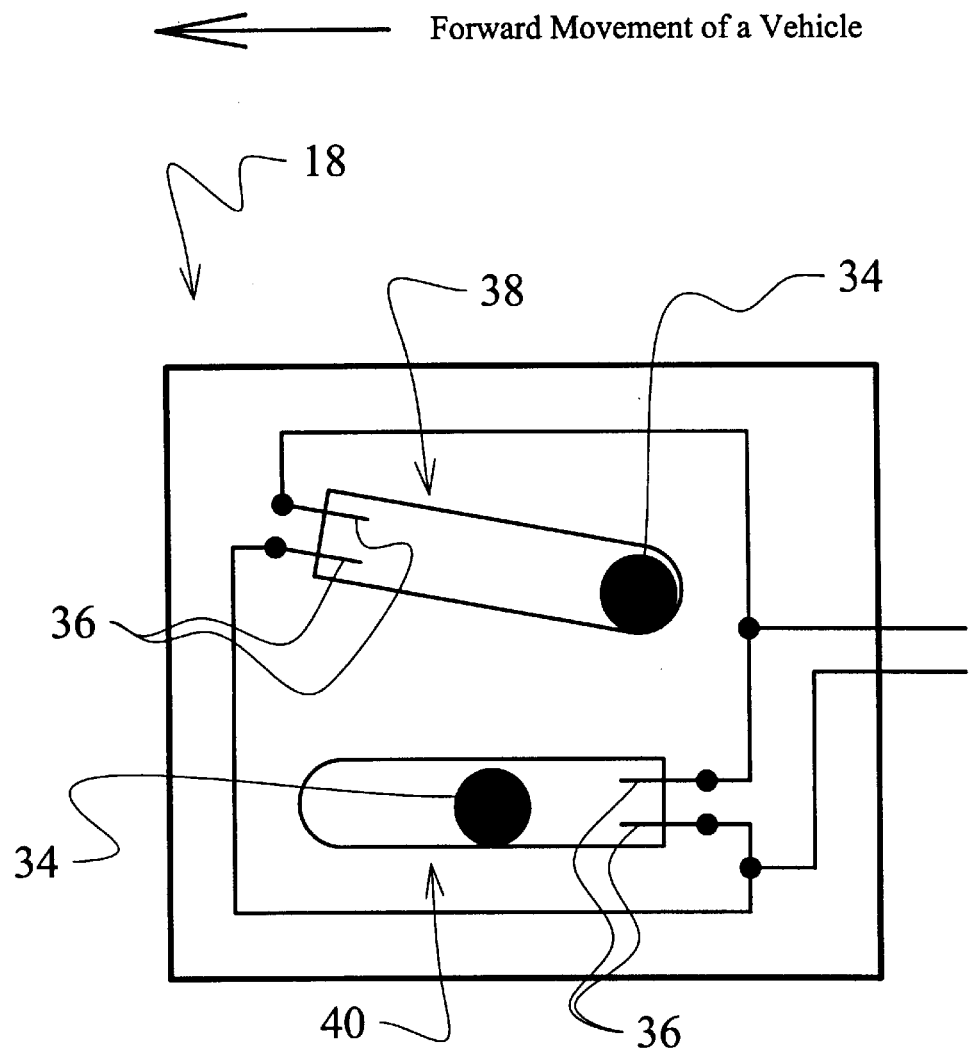
FIG. 5 is a schematic diagram of the mercury switch box.

Central to the sensor array is the mercury sensor 18, which is made of two identical, tilting type mercury switches, 38 and 40, as shown in FIG. 5. The mercury switch is basically a non-conducting tube with a ball of mercury 34 inside, one end of which is furnished with a pair of electrodes 36. The mercury ball 34 needs to be substantial in volume so that, when in contact with the electrodes 36, a secure electric conduction can be made while it is free to move inside the tube as well. The mercury sensor 18 and, therefore, the mercury switch 40 are secured to a vehicle level as shown in FIG. 5 such that the tube of the mercury switch 40 is aligned with the straight, forward direction of the movement of the vehicle. The electrodes 36 trail the mercury ball 34. Arranged in this manner, the mercury switch 40 is used in detecting forward acceleration of a vehicle.

Connected in parallel to the mercury switch 40 is the mercury switch 38, which is positioned with the electrodes preceding the mercury ball such that the forward end is tilted upward (around 5 degrees) as shown in FIG. 5. This switch is provided for the deactivation of the brake lights the case when the acceleration downhill is not detected by the mercury switch 40.

The particular invention in FIG. 4 utilizes five, commonly available 5-pin, 12 V SPDT relays and a resistor. These relays are designated as relay 1 through relay 5. The invention is connected to a mercury sensor 18, parking brake switch 22, cruise control switch 20, and an L. E. D. 28 as well as to the requisite battery terminals 26 and 30, ignition switch 14, brake pedal switch 32, and brake lights 24.

Figure 6:
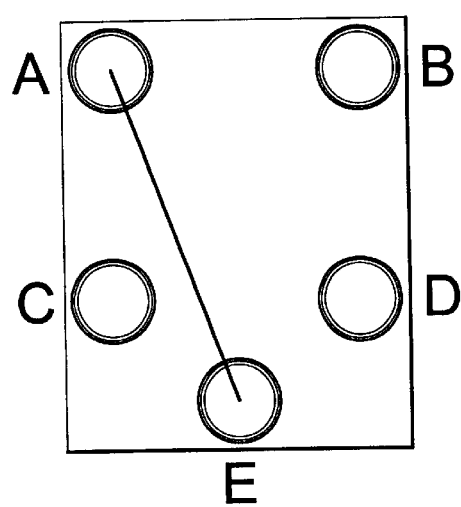
FIG. 6 is a schematic diagram of a 5-pin relay in the activated and deactivated states.
Figure 6:
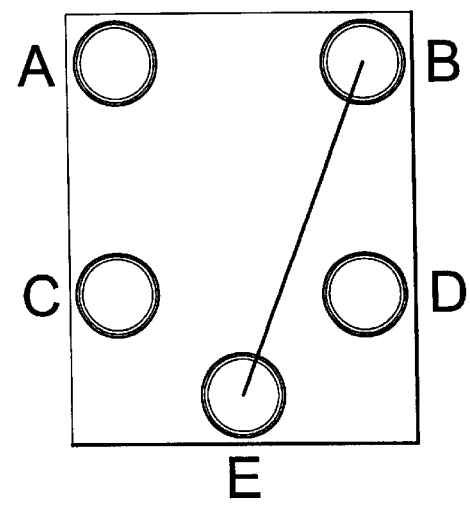

A general diagram of a 5-pin relay used in FIG. 4 is shown in FIG. 6 in normal and activated states. The five terminals of this relay is designated with capital letters ranging from A to E. E is the common terminal. A and B are the output terminals, where A is in conduction with the common terminal E in normal, deactivated state whereas B is in conduction with the common terminal E in activated state. The terminals C and D receive control voltages.

The relay designations such as the relay 1 through relay 5 as well as the letter notation of the five terminals of a particular relay is used consistently throughout this description as well as in the appended claims. A number designating a particular relay may proceed a letter notation of a terminal of that relay.

In the invention in FIG. 4, negative voltage from the battery terminal 26 is constantly supplied to the terminals 1C and 1E of the relay 1 as well as to the terminals 5B and 5C of the relay 5. The terminals 1C and 1E are connected to receive the power at the same time, which keeps the terminal 1C always energized. Also constantly energized is the terminal 2E, this time with a positive voltage from the battery terminal 30. Upon the activation of the ignition switch 14, positive voltage is supplied to the terminals ID, 3C and 4C. Since this activates the relay 1, additional negative voltage reaches the terminal 3E from 1B.

The particular relay shown in FIG. 4 which is used for latching purpose is a standard 5-pin, 12 V SPDT relay with terminals 2B and 2C hardwire connected so that the relay latches when it is activated. Other commercially available 12 V relays specifically designed to latch and unlatch upon supply of voltage can also be used for this invention. In FIG. 4, the terminals 2B and 2C are connected. In absence of control voltage at 3D, the relay 3 is in normal state, which ensures the supply of negative voltage at the terminal 2D from 3A and 3E. Once the brake pedal 16 is depressed and the brake pedal switch 32 is closed, relay 2 becomes activated. This keeps the terminals 2C, 2B and 2E energized at the same time, and the relay 2 remains activated even after the brake pedal switch 32 opens following the release of the brake pedal 16. This accomplishes the latching action that ensures constant supply of power to the brake lights 24 and the L. E. D. 28 until the relay 2 is deactivated by the activation of the relay 3 by the sensor array.

The negative control voltage from the mercury sensor 18 is received at the terminal 3D and activates the relay 3 which then deactivates the relay 2 thereby unlatching it. The control voltage from the mercury sensor 18 will reach 3D only when the relay 4 is in normal state. When parking brake is applied after stopping the relay 4 is activated and blocks negative voltage from the mercury sensor 18 to reach 3D and activate the relay 3. This allows the relay 2 to remain latched and power to the brake lights is maintained. When the cruise control is engaged during driving and there is no need for brake lights to be maintained illuminated negative voltage is generated by the activation of the relay 5 which activates the relay 3. Activation of the relay 3 deactivates and unlatches the relay 2 and constant supply of power to the brake lights is removed.

Figure 7:
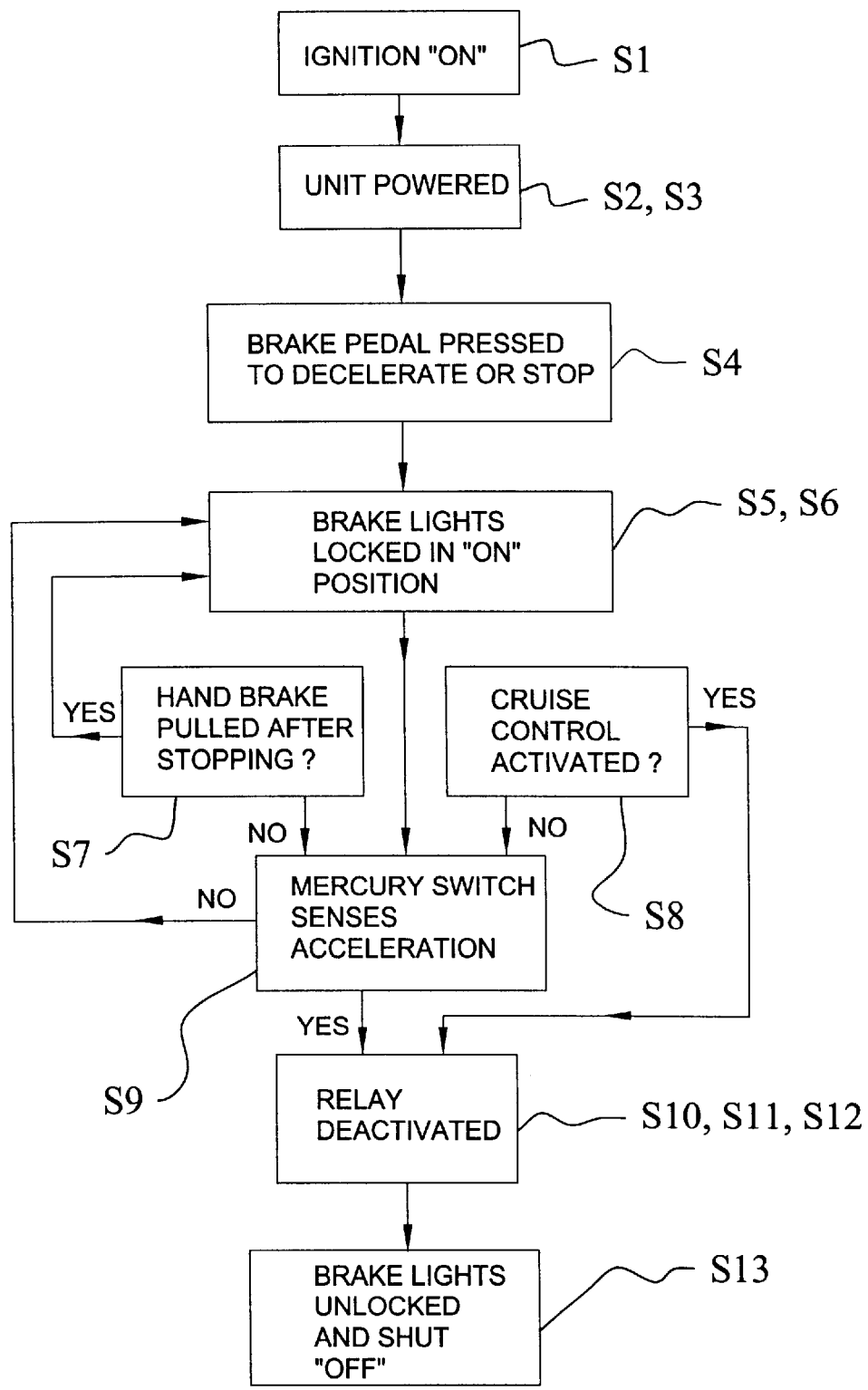
FIG. 7 is a flow chart of the present invention.
Figure 8:
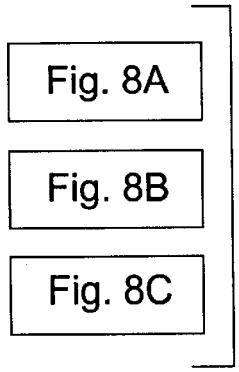
FIG. 8 is a flow chart of the processing of the control unit of the present invention.
Figure 8A:
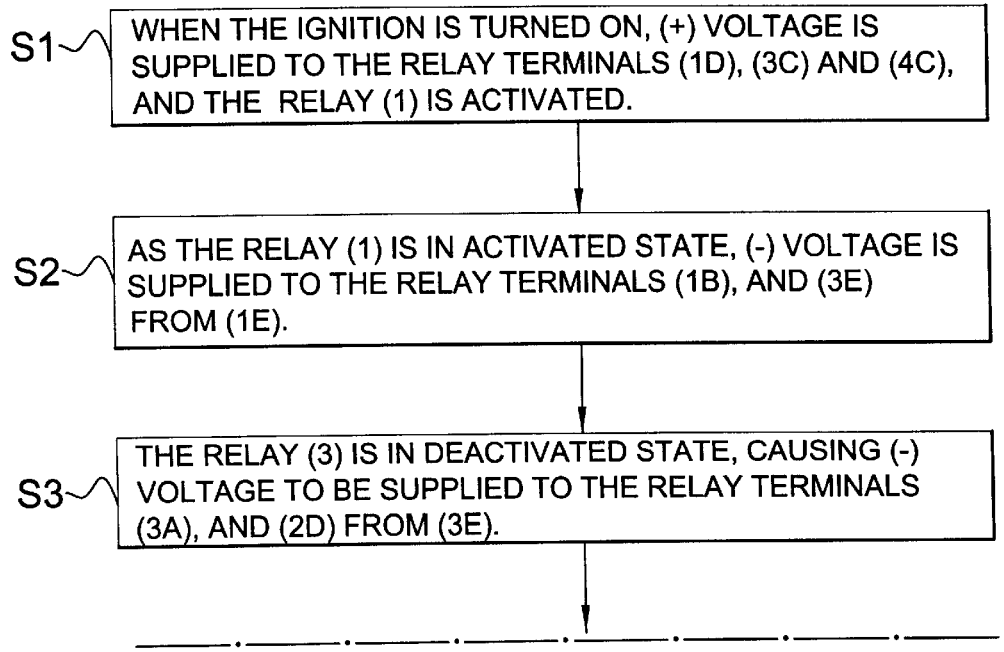
Figure 8B:
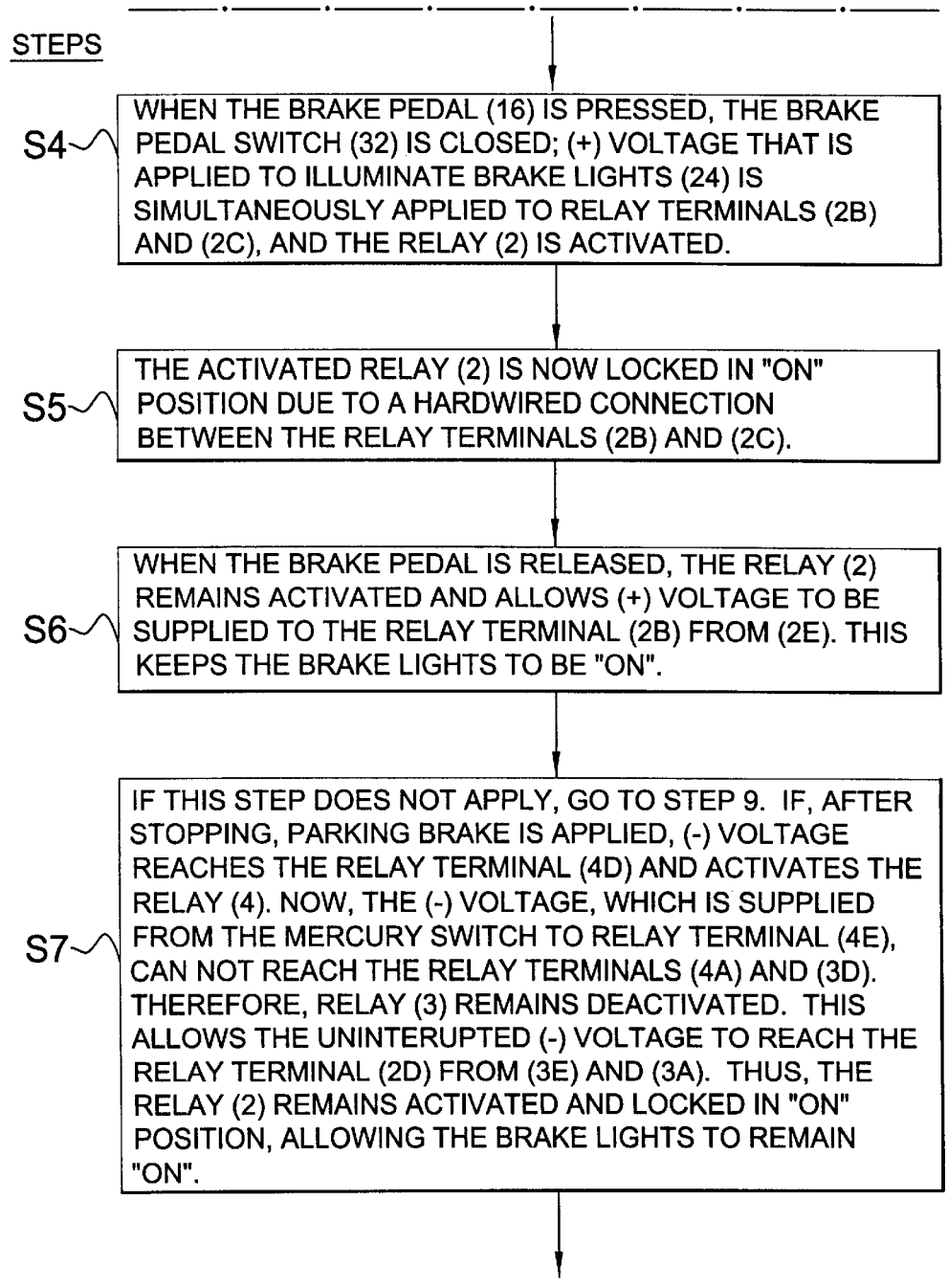
Figure 8C:
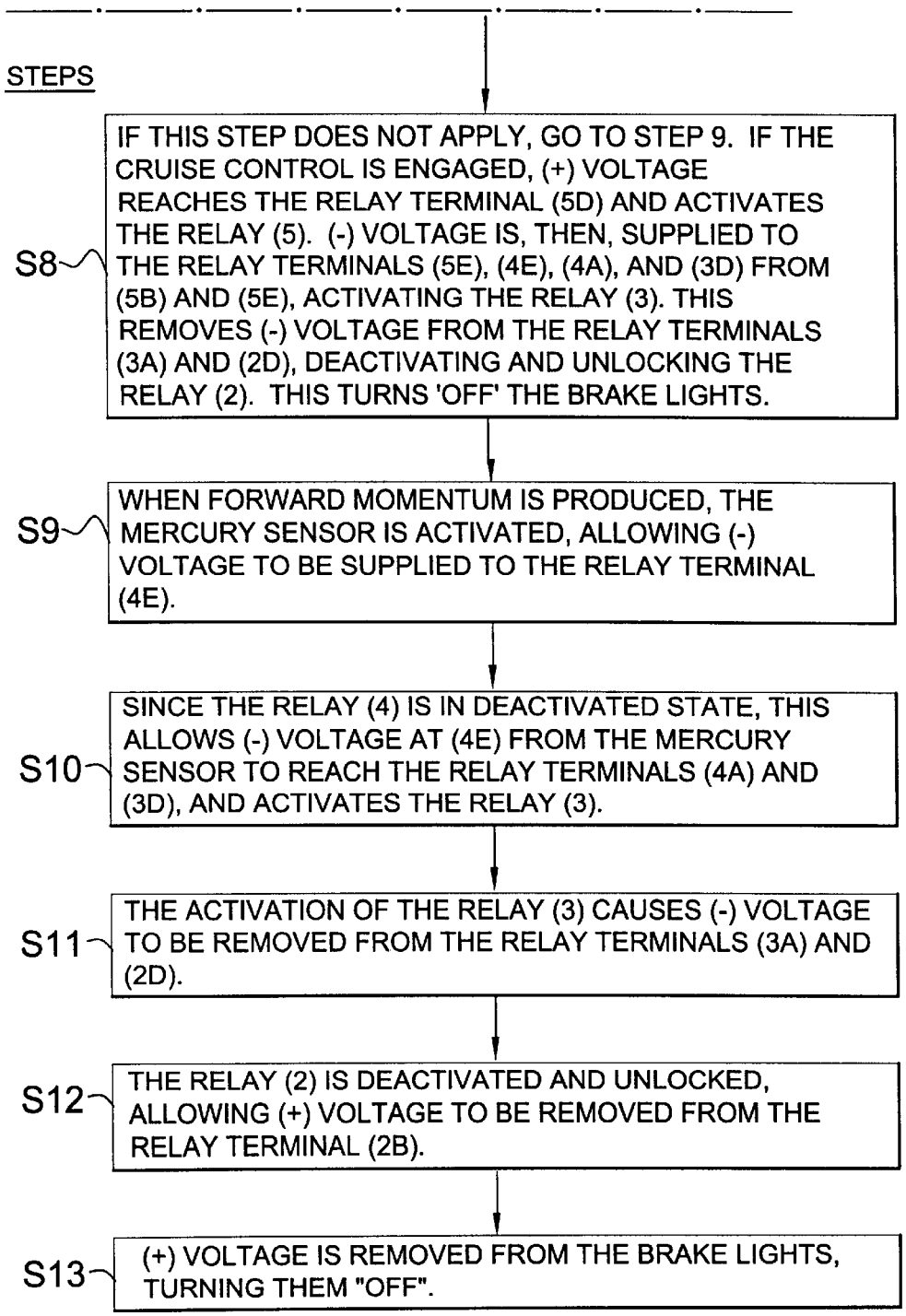
Figure 9:
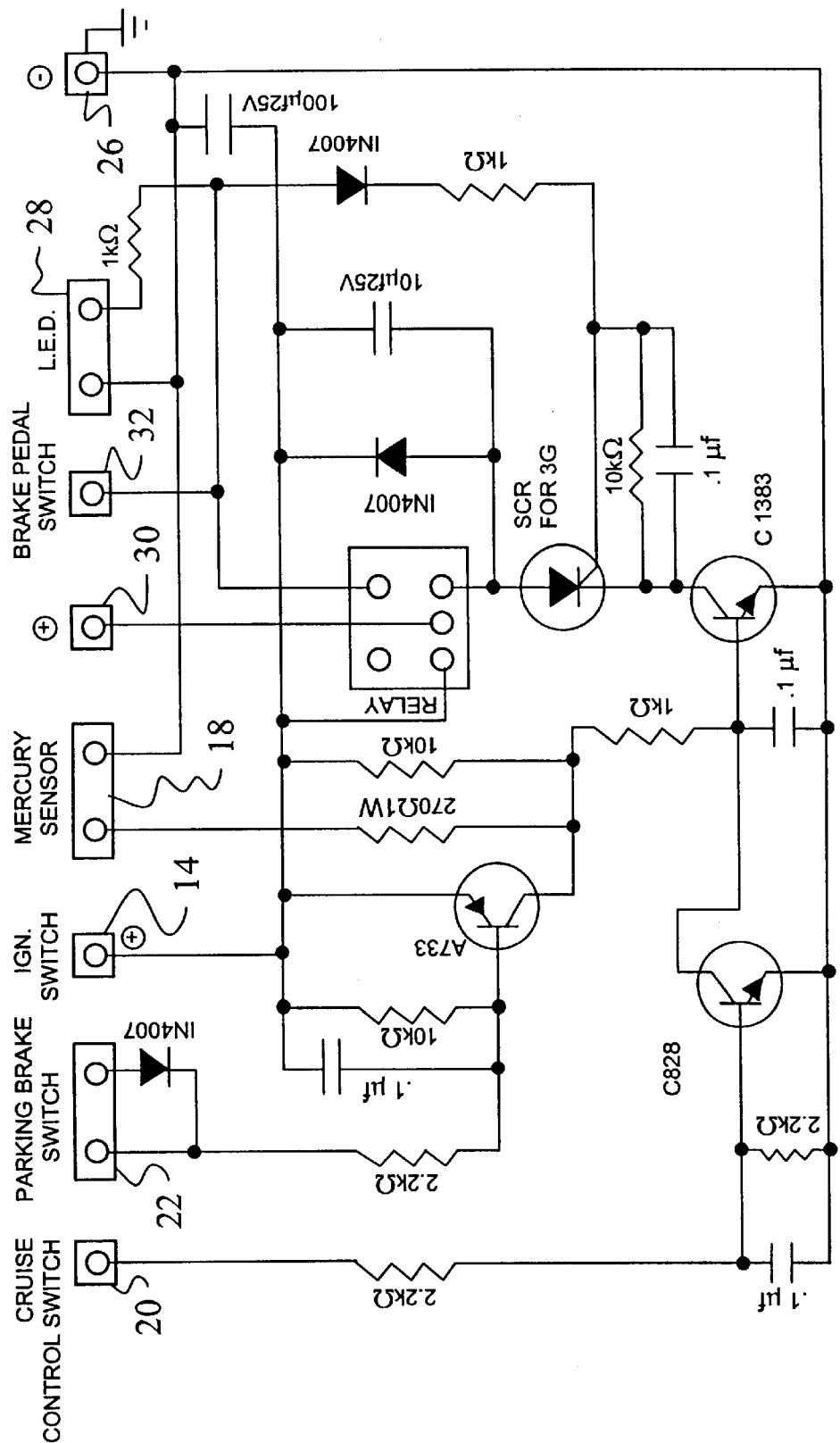
FIG. 9 is a schematic electronic circuit diagram of the brake lights locking/unlocking system of the present invention.

This process of latching and unlatching actions is illustrated in the form of a flow chart in FIG. 7 and detailed in FIG. 8. A typical electronic circuit representation of the invention depicted in FIG. 4 is shown in FIG. 9.

What is claimed is:

1. A sustained brake lights illumination device for a motor vehicle having a number of brake lights, a brake pedal, a brake pedal switch, a parking brake, a parking brake switch, a battery, and an ignition switch as well as an optional L. E. D. indicator on a dashboard and an optional cruise control comprising:
   a) a latching relay, which delivers and sustains power from said battery to said brake lights upon the depression of said brake pedal;
   b) sensing means for detecting the state of the movement of said motor vehicle and deactivating said latching relay by permitting, blocking or supplementing the control voltage according to a predetermined priority;
   c) second means for directing power from said battery to said latching relay as well as to said sensing means in accordance with the action of said ignition switch; and
   d) said latching relay comprises the relay 2 and relay 3, both of which are 12 V, 5-pin relays, wherein constant positive voltage from said battery is supplied to terminal 2E; additional positive voltage from said battery is supplied to the terminal 3C by said second means upon the activation of said ignition switch; negative voltage from said battery is applied to the terminal 3E by said second means upon the activation of said ignition switch, wherein the terminals 2B and 2C are connected; the terminals 2D and 3A are connected, wherein the terminal 2B, said brake lights and said optional L. E. D. are connected, to which said brake pedal switch is attached leading from the positive terminal of said battery, wherein, upon the closing of said brake switch following the depression of said brake pedal, said relay 2 is activated and remain activated even after the release of said brake pedal until relay 3 is activated by receiving control voltage from said sensing means at the terminal 3D, thereby deactivating said relay 2.

2. The sustained brake lights illumination device as claimed in claim 1, wherein said latching relay is a 5-pin, 12 V, single coil, SPDT relay.

3. The sustained brake lights illumination device as claimed in claim 1, wherein said second means is the relay 1, which is a 12 V, 5-pin relay, wherein the terminals 1C and 1E are connected and supplied with negative voltage from the negative terminal of said battery; the terminal 1D is connected to said ignition switch, wherein, upon the activation of said ignition switch, relay 1 is activated, and negative voltage is delivered to the terminal 1B, from which negative voltage is further delivered to terminal 3E.

4. The sustained brake lights illumination device as claimed in claim 1, wherein said sensing means comprising:
   a) the relay 4, wherein the terminal 4C is supplied a positive voltage, the terminal 4A is connected to the control terminal 3D;
   b) a mercury sensor comprising two tilting type mercury switches that are connected in parallel bridging the terminal 4E and the negative terminal of said battery such that one mercury switch is arranged level in the direction of the movement of said motor vehicle with the electrodes trailing so as to detect the forward acceleration of said motor vehicle, and the other mercury switch is arranged with the electrodes positioned forward and inclined up by a predetermined angle so as to detect the downhill driving condition of said motor vehicle,
   whereby, upon receiving negative control voltage from said mercury sensor at the detection of the forward acceleration of said motor vehicle, the terminal 3D of said relay 3 receives said control voltage, which, in turn, activates said relay 3 and deactivates said relay 2; and the power supply to said brake light is terminated.

5. The sustained brake lights illumination device as claimed in claim 4, wherein said sensing means further comprising a connection from said parking brake switch to said terminal 3D, wherein, upon the activation of said parking brake switch, said relay 4 is activated, and the control voltage from said mercury sensor to the terminal 3D is blocked thereby leaving said brake lights illuminated.

6. The sustained brake lights illumination device as claimed in claim 5, wherein said sensing means further comprising the relay 5, where the terminals 5B and 5C are charged negative, and to which said optional cruise control is connected at the terminal 5D, wherein, upon the activation of said cruise control, positive voltage is supplied to said terminal 5D, activating relay 5, whereupon terminals 5E, 4E, 4A and 3D are supplied with a negative voltage from said terminal 5B; and the relay 2 is deactivated following the activation of said relay 3, thereby the power supply to the said brake lights is terminated.

* * * * *